Jan. 13, 1942.　　　　C. W. MOTT　　　　2,269,983
POWER LIFT
Filed March 26, 1940　　　　2 Sheets-Sheet 1

Inventor
Carl W. Mott
By Paul O. Pippel
Atty.

Jan. 13, 1942.   C. W. MOTT   2,269,983
POWER LIFT
Filed March 26, 1940   2 Sheets-Sheet 2

Inventor
Carl W. Mott
By Paul O. Pippel
Atty.

Patented Jan. 13, 1942

2,269,983

UNITED STATES PATENT OFFICE 2,269,983

POWER LIFT

Carl W. Mott, La Grange, Ill., assignor to International Harvester Company, a corporation of New Jersey Application March 26, 1940, Serial No. 326,060

14 Claims. (Cl. 97—50)

This invention relates to power lift devices, and more particularly to the connection of the same to a tractor, and to the connection of the device to the implements which may be connected to the tractor for movement to and from their working position.

In a copending application Serial No. 326,059 by the present inventor filed under even date, there is shown a hydraulic lifting arrangement including a pump, control, and reservoir housing, and a separate power actuating device associated with the pump and control mechanism for actuation by the same. The invention in that application is directed to the internal control mechanism and the sequence of operation of the same, and includes certain features making for safety of the device. While there was somewhat of a showing of the connection of these parts to the tractor, there was no attempt to claim the same in that application, as it was believed that the same was divisible subject-matter.

It is, therefore, the object of the present invention to provide for the attachment of the separate parts of a power lift arrangement, as shown to some extent in this pending application, and their connections to the tractor, and for operation of a directly connected implement thereto.

It is another object of the present invention to provide in a hydraulic arrangement a simplified means for the attachment of the same to the tractor wherein the same may be made in the field by the owner of the tractor upon separate purchase of the power lift arrangement.

It is another object of the invention to provide an improved supporting means for the attachment of the power actuating device on the reservoir housing.

According to the present invention, there has been provided in the tractor body portion a plurality of openings, through one of which may be inserted the reservoir housing, and through the other of which may be connected a control extension means adapted for connection to a part on the housing and wherein such connection may be made secure by means operable externally of the tractor body portion. The extension means is merely inserted through this opening for engagement with the means on the housing and made secure thereto by a bolt screw passing through the extension means for connection with the means on the housing. The bolt screw may be tightened from outside of the body portion of the tractor. Through the first mentioned opening on the tractor body portion, there may be also fitted a means for connecting the parts on the reservoir housing adapted to be driven with the drive gear within the tractor body portion. This connecting means is such that it may be connected to the respective parts by merely sliding the same diametrically across the opposing face portions carried respectively by the parts on the housing and by the drive gear mechanism. Also, the supporting means for the support of the hydraulic cylinder actuating device may be quickly attached to the reservoir housing, and it will be automatically retained when turned into position for the supporting of the hydraulic actuating device. For other objects and for a better understanding of the present invention, reference may be had to the following detail description taken in connection with the accompanying drawings, in which:

Figure 1:
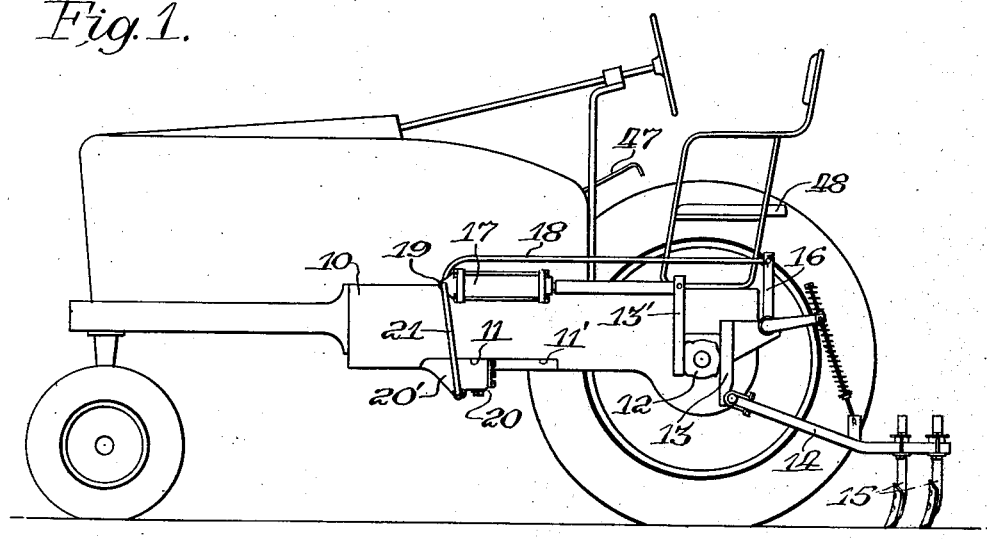
Figure 1 is a view in elevation of a tractor with one rear wheel removed and showing the connection of the hydraulic arrangement to an implement directly connected thereto.
Figure 2:
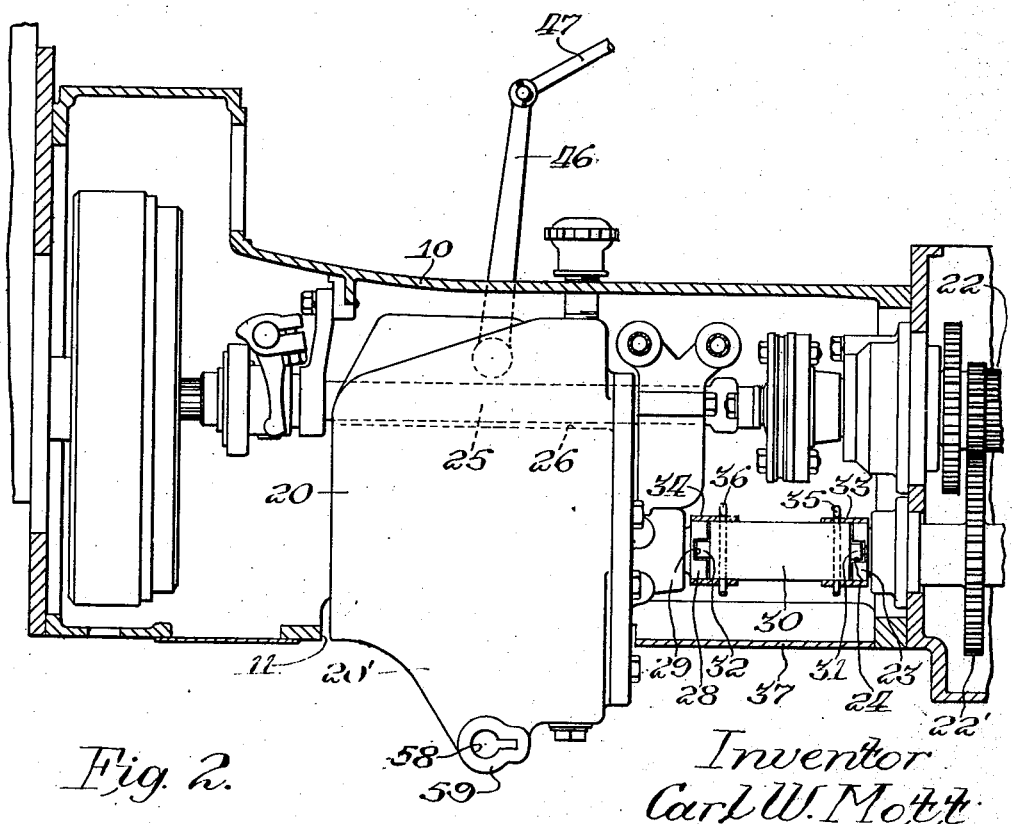
Figure 2 is an enlarged view in cross section of a portion of the tractor body having an opening for the insertion of the reservoir housing and also showing the connecting means between the housing and the drive gear mechanism of the tractor.
Figure 5:
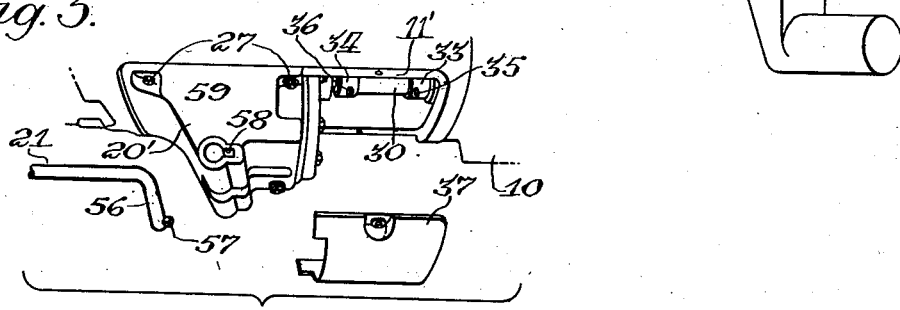
Figure 5 is likewise an exploded view, showing the under portion of the tractor and of the reservoir housing fitted through an opening therein, with the power actuating device supporting means, and the cover plate for closing that part of the opening that remains; and, Figure 6 is a view similar to Figure 5, showing the supporting means and cover plate secured in their fitted positions.

Referring now to Figures 1, 2, and 5, there is shown a tractor or motor-propelled vehicle having a body portion 10 with an opening 11 in the under portion thereof and accessible from under the tractor. Extending laterally from the tractor body portion and as shown in Figure 1, there is a transverse axle housing 12 to which is connected a bracket structure 13 in the usual manner and to which in turn is pivoted a ground-working implement 14 for movement to and from its ground-working position. This ground-working implement 14 has working tools 15 and is connected to a rockable means 16 likewise carried on the bracket structure 13 and which is adapted to be operated by a cylinder power actuating device 17 through a rearwardly extending connecting link 18 connected at the forward end thereof, as at 19, to the cylinder device 17. The cylinder device 17 may react through a portion 13' of the bracket structure 13.

Fitted through the opening 11 and into the tractor body portion 10 is a pump, control, and reservoir housing 20 adapted to have attached thereto a cylinder device supporting means 21, which is likewise connected at 19 to the cylinder device 17.

Referring now particularly to Figure 2, it will be noted that the tractor body portion 10 has a drive gear mechanism 22 and adapted through gears 22' to drive a face portion 23 having a groove 24 therein, and extending diametrically entirely across the same.

Also forming a part of the drive mechanism 22 is a propeller shaft 25 extending lengthwise along the tractor body portion. When the reservoir housing 20 is inserted into the body portion 10, a recessed portion 26 of the same is provided in such manner that the propeller shaft 25 may be nested within it. The reservoir housing 20 may thereby be almost completely disposed within and across the tractor body portion 10, leaving but a small bottom portion 20' projecting downwardly from the tractor body portion 10. The reservoir housing 20 may be secured to the flange portions of the opening 11 by means of bolts 27. When the reservoir housing 20 is so fixed within the tractor body portion 10, it will be noted that a means, having a face portion 28 and adapted to be driven in order to drive the pump within the housing 20, is located axially opposite to the face portion 23 of the drive gear mechanism 22. This portion 28 may likewise have a groove 29 extending diametrically across the same and corresponding to the groove 24 of the face portion 23 of the drive mechanism 22.

These face portions are somewhat removed with respect to each other and, in order for the portion 28 to have power drive to the same, it is necessary that a connecting means be provided between these two face portions 23 and 28. Since there is very little available space in which one can work in making this connection within the body portion, it should be apparent that, by the use of a connecting means coupling 30 having at each end respectively thereof a projecting portion 31 and 32 extending diametrically across the same, the connection may be made by mere sliding of the same, so that the projecting portions 31 and 32 will be moved into cooperative relation with the respective grooves 24 and 29. Assuming that the grooves 24 and 29 are so arranged that they extend perpendicularly and at right angles to the position shown in Figure 2, it will only be necessary to move the member 32 vertically through that portion 11' of the opening 11, which is yet not closed by the reservoir housing, until the projected portions 31 and 32 are flush with their respective grooves.

Figure 6:
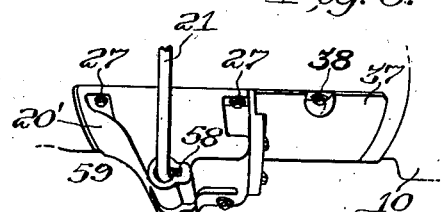

As a means for maintaining the element 30 in its connected position, there are provided sleeves 33 and 34, respectively, which are carried with the element 30 upon it being positioned and, after being positioned, may be slid axially for cooperative relation with the face portions 23 and 29, respectively, and thereby held respectively by pins 35 and 36 extending through the sleeve and through the element 30. Once the connection has been made, the portion 11' of the opening 11 will then be closed by a cover plate 37 and secured, as shown in Figure 6, by means of bolts 38 to the flange of the opening 11.

Figure 3:
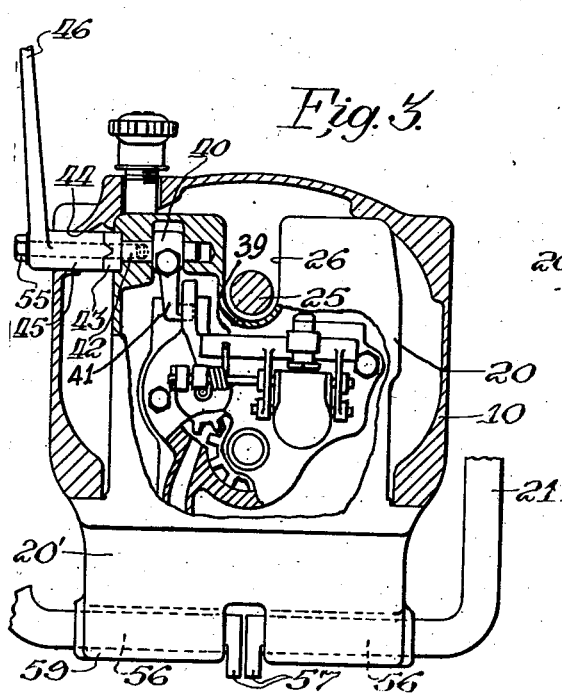
Figure 3 is a cross sectional view through a portion of the tractor and illustrating in detail the connection of the control extension means to the operating means on the reservoir housing.

Once the reservoir has been fitted within the tractor body portion and the connection made with the drive gear mechanism 22, it is necessary that some means be extended through the tractor body portion 10 in order that the control mechanism, indicated generally at 39 of Figure 3, be operated from means externally of the body portion 10. Associated with the housing 20, as seen in Figure 3, there is provided a rockable member 40 having an arm 41 for connection with the control mechanism 39 within the housing 20, said member 40 having an axially extending portion 42 with a coupling portion 43 presentable externally of the reservoir housing 20.

Figure 4:
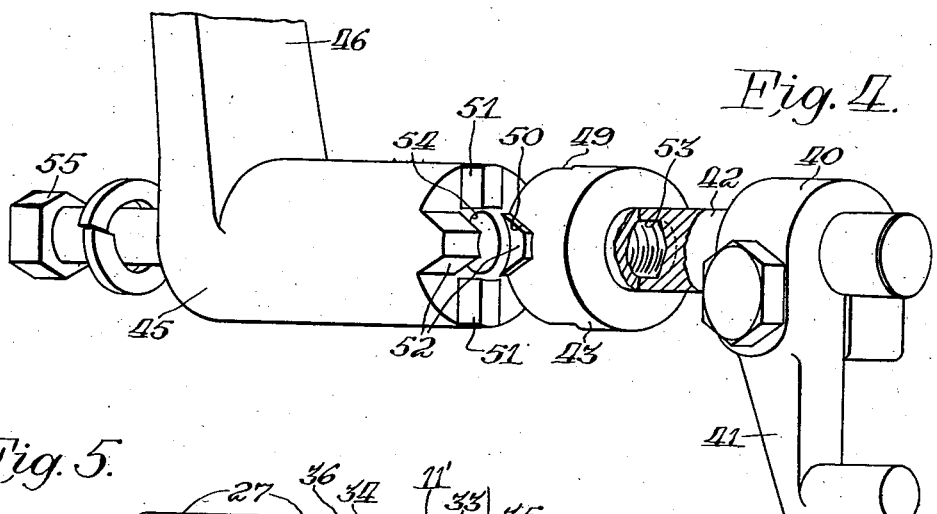
Figure 4 is an exploded view of the same control extension means and of the operating means separated from the reservoir housing, the same being illustrative of how the extension means may be made secure by means external of the tractor body portion of it.

The tractor body portion 10 has a second opening 44 through which may be projected an extension means 45 having a vertically extending arm 46 to the upper end of which may be connected the forward end of a manually operable link 47 extending to a location accessible to an operator's station 48 on the tractor. As seen more readily from Figure 4, the coupling portion 43 may have diametrically extended indentations 49 and 50, extending at right angles with respect to each other and across the face thereof for the reception respectively of projected tooth portions 51 and 52 on the extension means 45. Also, within the axially extending member 42, there is a threaded opening 53. Once the reservoir housing 20 has been inserted and made secure to the tractor body 10, the extension member 45 may be inserted through the opening 44 so that its tooth portions or projections 51 and 52 may respectively engage with the indentations 49 and 50.

As a means for maintaining the same in this engaged relationship, the extension means 45 is provided with a hole 54 through which may be passed a long screw bolt 55 for threaded connection with the threaded opening 53. It should be apparent that once registry is made of the face plate 43 with the opening 44 the extension means may be made secure to the operating means 40 by insertion of the same through the opening 44 and by the tightening of the bolt 55. It will also be apparent that this may all be accomplished externally of the tractor after the reservoir housing has been secured in place within the body portion 10.

According to the present invention, a supporting means 21 has an axially extending key portion 56 including a projection 57. When it is desired to make connection of the power actuated device 17 with the tractor, the key portion 56, having a projection 57, is slid through a recess 58 of a key slotted portion 59 of the reservoir housing 20 within the portion 20' thereof. The key slotted portion 59 extends only part way across the bottom of the reservoir housing, as is seen more clearly in Figure 3. Upon inserting this key portion 56, it will be noted that the supporting means 21 is positioned substantially horizontally with respect to the tractor. It is necessary that it be kept in this position until the projection 51 has slid through the full extent of the recess 58 and turned into registry with a face 60 and thereby kept from being actually removed from the reservoir housing. Upon turning the supporting means to a vertical position for the connection of the power actuating device 17, the projected portion 57 will be in full registry with the face 60 of the key slotted portion 59 of the reservoir housing 20. The supporting means 21 will then take the position shown in Figures 1 and 6.

It should now be apparent that, by the arrangement of the power lift parts and by so constructing the same for connection with the body portions of the tractor, the same has been simplified and a quick connection thereof may be made easily by the owner of the tractor; the reservoir housing 20 may be regidly secured to the body portion prior to the connection of the same with the drive mechanism and prior to the connection of the control handles to the same; all operation and connection of the device may be done readily from the outside of the tractor body portion; also, further, that means has been arranged for the reservoir housing wherein quick and secure attachment of the fluid device may be readily made by mere insertion of the supporting means into the key slotted portion of the reservoir housing and turned to a position for the supporting of the fluid device.

It is to be understood that any changes in the detail construction shall be within the spirit and scope of the present invention as defined by the appended claims.

What is claimed is:

1. In combination, a tractor having a hollow body portion and drive gear mechanism within the same, power lift means adapted to be connected to the tractor including a housing adapted to be fitted in said body portion and removed from the drive gear mechanism, means in the housing adapted to be driven, means external of said housing to which rotary movement may be supplied for driving the means in the housing, said drive gear mechanism and said external means each having a grooved face portion, opposing each other respectively, means for connecting said external means to the drive gear having projected portions for cooperation respectively with the grooved face portion, and means for retaining the connecting means in cooperative relation therewith.

2. In combination, a tractor having a hollow body portion and drive gear mechanism within the same, power lift means adapted to be connected to the tractor including a housing adapted to be fitted in said body portion and removed from the drive gear mechanism, means in the housing adapted to be driven, means external of said housing to which rotary movement may be supplied for driving the means in the housing, said drive gear mechanism and said external means each having a face portion with a groove extending diametrically across the same, the portions opposing each other respectively, means for connecting said external means to the drive gear having a projected portion at each end of the same and slidably engageable with the respective groove by movement diametrically across the face portions, and means for retaining the connecting means in cooperative relation respectively with the face portions.

3. In combination, a tractor having a hollow body portion with openings therein, an implement connected to the tractor for movement from one position to another position with respect thereto, and a hydraulic arrangement for moving the implement including a control mechanism and housing therefor, means for operating the control mechanism externally of the housing, said control housing adapted to be fitted within said hollow body portion of the tractor through one opening thereof for registry of the operating means with another opening thereof and a control extension means adapted to be connected to the control mechanism operating means upon being inserted through said other opening in the hollow body portion of the tractor and into operative engagement therewith, whereby the control mechanism will be operable by means accessible from outside the hollow body portion of the tractor.

4. In combination, a tractor having a hollow body portion with openings therein, an implement connected to the tractor for movement from one position to another position with respect thereto, and a hydraulic arrangement for moving the implement including a control mechanism and housing therefor, means for operating the control mechanism externally of the housing, said control housing adapted to be fitted within said hollow body portion of the tractor through one opening thereof for registry of the operating means with another opening thereof, and a control extension means adapted to be connected to the control mechanism operating means upon being inserted through said other opening in the hollow body portion of the tractor including means operable externally of the body portion for making secure the engagement of the same with the operating means.

5. In combination, a tractor having a hollow body portion with an opening therein, a power lift means including a control mechanism and a housing therefor adapted to fit into said hollow body portion, means for operating the control mechanism extending through the housing thereof and having indentations formed thereon, said operating means located within the body portion to be presentable to the opening therein, and extension means having tooth portions and extending through the opening in the body portion for engagement with the indentations formed in the operating means, and means for making secure the extension means in locked engagement with the operating means.

6. In combination, a tractor having a hollow body portion with an opening therein, a power lift means including a control mechanism and a housing therefor fitted into said hollow body portion, means for operating the control mechanism extending through the housing thereof, and having indentations thereon presentable to said opening in the body portion, said operating means having a threaded opening similarly presentable to said opening, extension means having tooth portions and extending through said opening into engagement with the indentations formed in the operating means, said extension means having a hole extending axially therethrough, and bolt means extending through said hole in the extension means and threaded into said threaded opening of the operating means for making secure the extension means teeth in locked engagement with indentations of the operating means.

7. In combination, a tractor having a body portion, an implement connected to the tractor for movement to and from its working position, a hydraulic power arrangement including a power-actuating device and a pump and reservoir housing connected to the body portion, means for connecting the power-actuating device to the implement to move the same, means for supporting the power actuating device for movement on the pump and reservoir housing, said housing having means cooperative with said supporting means for lockably retaining the same when moved to a position for the attachment of the power-actuating device thereto.

8. In combination, a tractor having a body portion, an implement connected to the tractor for movement to and from its working position, a hydraulic power arrangement including a power-actuating device and a pump and reservoir housing connected to the body portion, means for connecting the power-actuating device to the implement to move the same, means for supporting the power-actuating device for movement on the pump and reservoir housing, said housing having a key-slotted portion, and said supporting means for the power-actuating device having a key portion adapted for registry with the key-slotted portion of the housing to be lockably retained thereby when turned to a position for the attachment of the power-actuating device.

9. In combination, a tractor having a hollow body portion, an implement connected to the tractor at one end thereof for movement to and from its working position, a hydraulic power arrangement including a power-actuating device and a pump and reservoir housing fitted partially within the hollow body portion of the tractor mid-way between the ends thereof and extending therefrom for the attachment of the power-actuating device thereto, means for attaching the power-actuating device for fore and aft movement to the part of the reservoir extending from the body portion, said attaching means normally extending vertically to support the power-actuating device at the side of the tractor, means for connecting the power-actuating device to the implement to operate the same, said housing having means cooperative with said attaching means for lockably retaining the same in its position for the attachment of the power-actuating device thereto.

10. In combination, a tractor, an implement connected to the tractor for movement to and from its working position and including parts for moving the same with respect to the tractor, means on the tractor having a key-slotted portion, one of said implement parts having a key portion adapted for registry with the key-slotted portion to be lockably retained when turned to a position for the attachment thereto of other implement parts.

11. In combination, a tractor including a hollow longitudinal body having an opening in its bottom, a pump housing telescopically positioned upwardly through the opening into said housing and substantially occupying the transverse interior dimension of the body, means to secure said housing in place, a transverse rockable control member included in the housing, and a rockable exterior part extending through the body wall having a portion in transverse alinement with the control member and removably coupled thereto.

12. In combination, a tractor including a hollow longitudinally-extending body having an opening in its bottom, a pump housing telescopically positioned upwardly through the opening into said housing and substantially occupying the transverse interior dimension of the body, means to secure said housing in place, a transverse rockable control member included in the housing, and a rockable exterior part extending through the body wall having a portion in transverse alinement with the control member and removably coupled thereto, said housing on its top side being provided with a longitudinal depression for the free passage of a longitudinal power transmitting shaft included in the tractor.

13. In combination, a motor-propelled vehicle having a hollow body portion with openings therein, a power take-off arrangement for taking power from the motor of the vehicle including control mechanism and a housing therefor, means for operating the control mechanism presentable externally of the housing, said control housing adapted to be fitted within said hollow body portion of the vehicle for registry of the operating means with another opening thereof, and a control extension means adapted to be connected to the control mechanism operating means upon being inserted through said other opening in the hollow body portion and into operative engagement therewith, whereby the control mechanism will be operable by means accessible from the hollow body portion of the vehicle.

14. In combination, a tractor having a hollow body portion with an opening in its wall thereof, said tractor having a power-transmitting shaft extending through the hollow body portion in alignment with the opening, a power take-off arrangement deriving power from the tractor including a housing adapted to be telescoped through the opening in the body wall, said housing having a depression to allow for the nesting therein of the power-transmitting shaft.

CARL W. MOTT.